Nov. 28, 1933.  N. R. KRAUSE  1,936,630
COMBINATION HARVESTER-THRESHER
Filed March 31, 1926   3 Sheets-Sheet 1
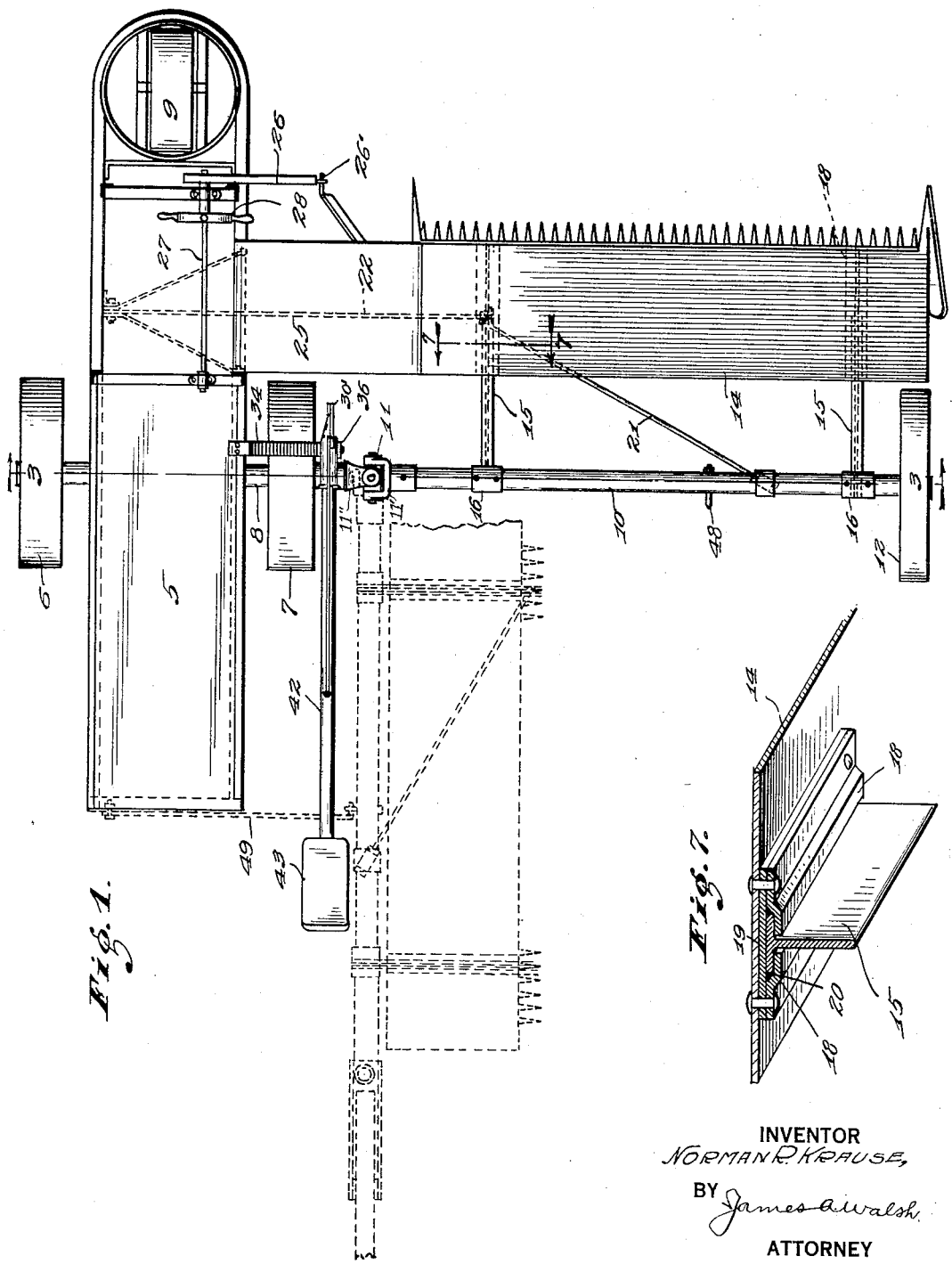
INVENTOR
NORMAN R. KRAUSE,
BY James A. Walsh
ATTORNEY Nov. 28, 1933.  N. R. KRAUSE  1,936,630
COMBINATION HARVESTER-THRESHER
Filed March 31, 1926  3 Sheets-Sheet 2
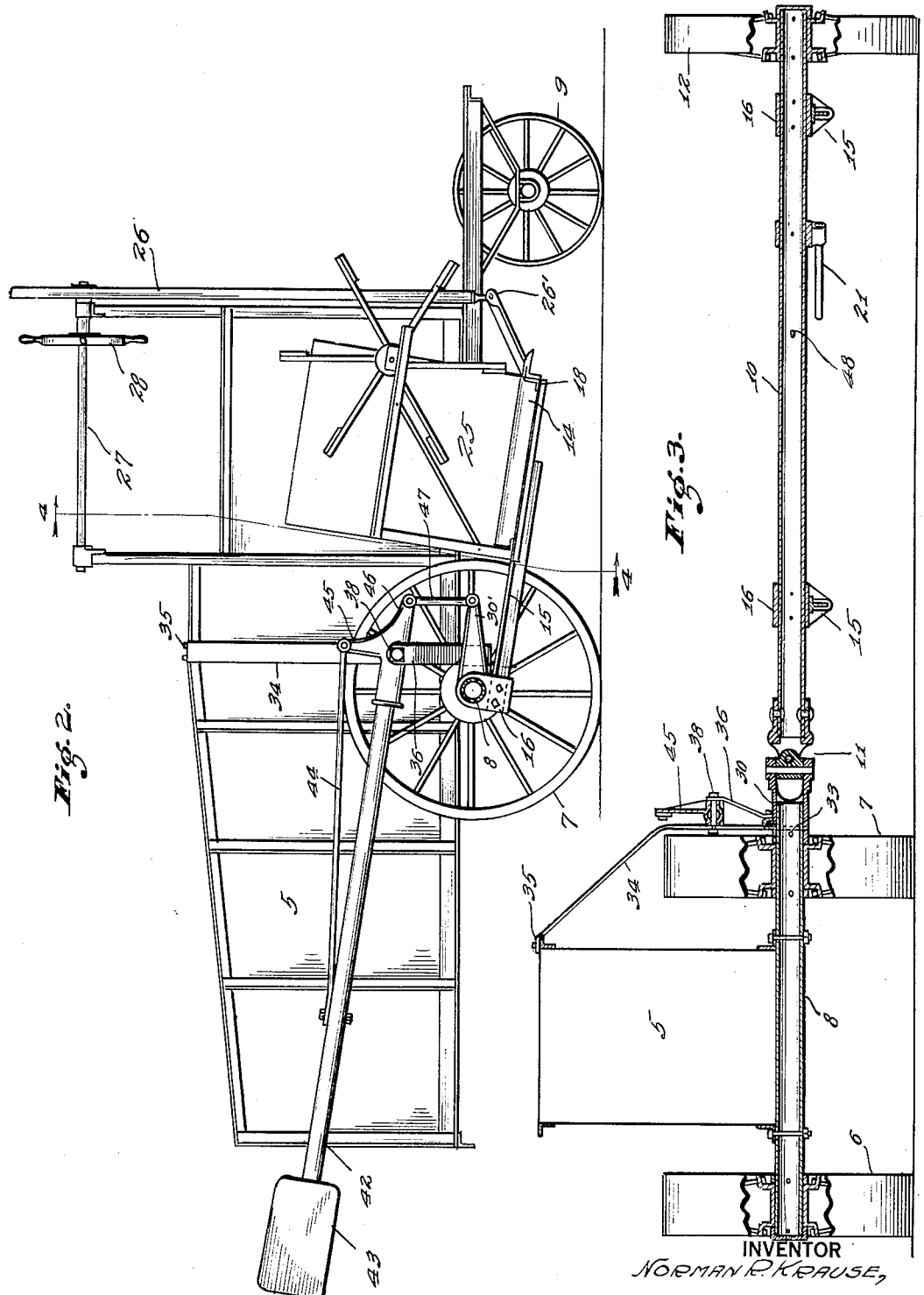

Nov. 28, 1933.  N. R. KRAUSE  1,936,630
COMBINATION HARVESTER-THRESHER
Filed March 31, 1926   3 Sheets-Sheet 3
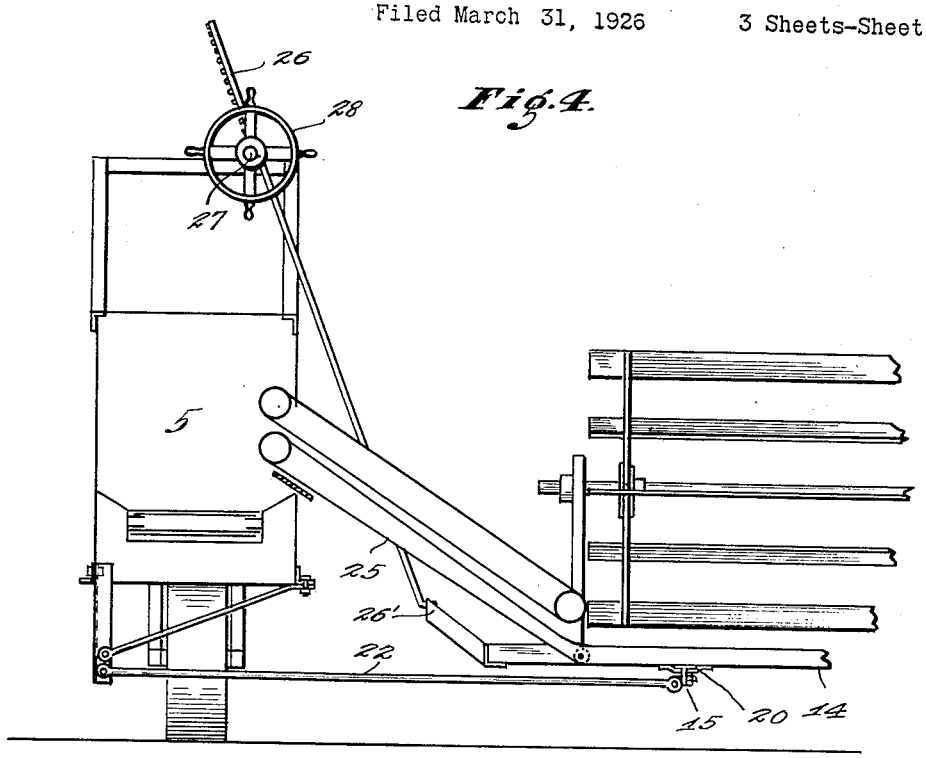
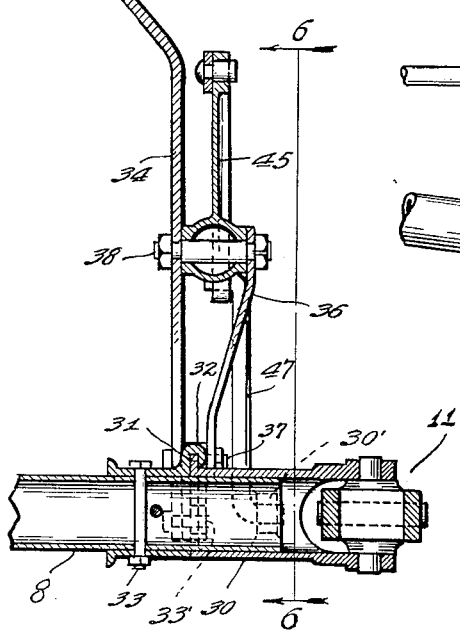 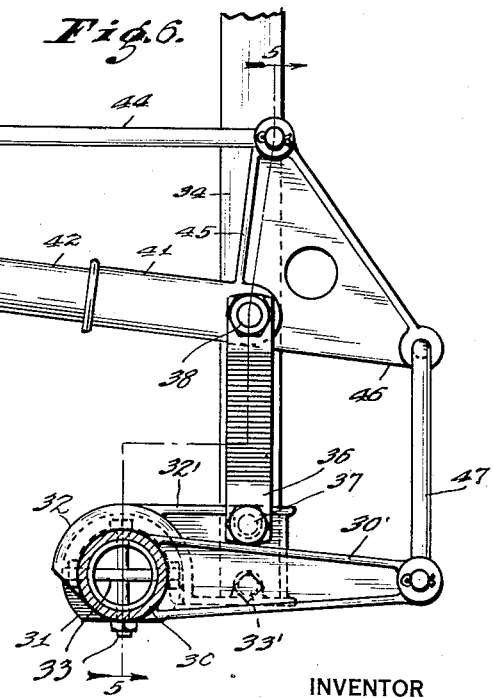
INVENTOR
NORMAN R. KRAUSE,
BY James A. Walsh
ATTORNEY Patented Nov. 28, 1933

1,936,630

UNITED STATES PATENT OFFICE 1,936,630

COMBINATION HARVESTER-THRESHER

Norman R. Krause, Racine, Wis., assignor to J. I. Case Company, Racine Wis., a corporation of Wisconsin Application March 31, 1926. Serial No. 98,882

30 Claims. (Cl. 56—20)

My invention relates to improvements in combination harvester-threshers, and particularly to means for reducing the width of the machine in entirety when the harvester has been folded alongside the thresher so that it may be in comparatively compact form for passing through gates, over bridges and the like, and for storage purposes; and said improvements further consist in counterbalancing mechanism for readily controlling the vertical movements of the harvester element during field operations, as will be hereinafter more fully explained.

In the accompanying drawings, forming part hereof, Figure 1 is a plan of a combination harvester-thresher embodying my improvements; Fig. 2 a side elevation; Fig. 3 a transverse section taken on the dotted line 3—3 in Fig. 1; Fig. 4 a section through the thresher taken on the dotted line 4—4 in Fig. 2 and also showing the harvester in fragment; Fig. 5 an enlarged detail section of a portion of the counterbalancing mechanism taken on the dotted line 5—5 in Fig. 6; Fig. 6 a fragmentary side elevation thereof taken on the dotted line 6—6 in Fig. 5; and Fig. 7 is a fragmentary perspective taken on the dotted line 7—7 in Fig. 1.

In said drawings the portions marked 5 indicate the thresher mounted upon wheels 6, 7, supported by an axle, 8, the forward end of the thresher being also preferably supported by a steering wheel, 9. To the axle 8, or other appropriate part of the thresher frame, I secure an axle, 10, by means of a flexible coupling, 11, which will permit the vertical and horizontal swinging of said axle 10, and support the outer end of the latter axle by a grain-wheel, 12, in a well known manner, said coupling being pivotally mounted on the thresher and fixedly connected to the inner end of the harvester axle. The harvester, 14, is mounted upon said axle 10 by telescoping arms comprising the members, 15, Fig. 1, secured to the collars, 16, said members being preferably T-shaped in cross section, and upon which I slidably mount guideways, 18, secured to the harvester frame, said guideways comprising a plate, 19, having inwardly extending flanges, 20, secured thereto and spaced therefrom so that they will freely shift or telescope upon said arms 15. The axle 10 may be suitably braced to the harvester by means of a rod, as 21, and the harvester in turn is braced to the thresher by a detachable link 22, said rod and link passing beneath the harvester and each connected at approximately the same point to an arm 15, with the effect that said harvester and axle are rigidly connected by arm 15, while the draft member or link 22 pivoted to the thresher and harvester permits free vertical movement of the latter under the conditions required for its adjustment, which rod and draft member thus constitute a continuous brace between the harvester, thresher and axle and of a character which will not interfere with the adjustments of the conveyer 25 and said harvester. As indicated, link 22 serves as a draft member and resists the pull of the harvester during field operations so that the latter is maintained in alinement with the thresher and prevented from turning or deviating from its straight course. The harvester, as is common, is provided with a conveyer, 25, which may be thrown back thereon or removed, as desired, when the harvester is to be folded.

As will be understood, by removing the draft member 22, the harvester 14 with its axle 10 may be swung around alongside the thresher in the position indicated by the dotted lines, the harvester, by means of the telescoping guideways 18 and members 15 (Fig. 1), being positioned close to said axle as indicated by said dotted lines, and by which adjustment the distance between the axle and harvester is materially reduced, so that when thus arranged the width of the machine including the thresher and harvester may be appreciably decreased for the purposes stated. Grain-wheel 12 may be of the caster type, or when swung around to the position indicated in Fig. 1 said wheel 12 may be removed and substituted by a caster-wheel provided with suitable means for swiveling attachment to said axle 10.

In field operations it becomes necessary to adjust the harvester 14 to the desired height for cutting grain, and this may be accomplished in any desired manner, the means shown being a rack-bar, 26, connected to the harvester, as at 26' and passing upwardly to engage a pinion (not shown) on shaft 27, which is rotated by a tiller-wheel, 28, in a well known manner, to cause rack-bar 26 to raise or lower said harvester as desired. In thus manipulating tiller-wheel 28 to adjust the harvester, it will be understood that the latter is of considerable weight, and in order to enable an attendant to perform such adjustment with slight exertion I provide member 30 of coupling 11 in the form of a sleeve and having an arm 30' extending forwardly therefrom, so that said sleeve may rotate about axle 8 or other suitable mounting on the thresher, said sleeve having a flange, 31, which is revolvably held in a flanged keeper, 32, secured by bolts, 33, or otherwise. It will thus be seen that axle 10 may be rocked in relation to axle 8 or other portion of the thresher to which axle 10 may be attached. Said keeper 32 is provided with an extension member 32' and is connected, at 33', to a brace, 34, which latter at its upper end, 35, is attached to thresher 5, Fig. 2. Said extension 32' is further secured to said brace 34, and to a supporting member 36, by a bolt 37, which brace and member are also connected by a bolt 38, and constitute a frame for supporting counterbalancing mechanism to be now described. Upon said bolt 38 I pivotally mount counterbalancing mechanism comprising a socket, 41, to which I secure a beam, 42, having a weight, 43, at its outer end, and which beam is suitably trussed by a rod 44 connected thereto and to an arm 45 on said socket member 41. The end 46 of said socket member is connected by a link 47 to arm 30', said parts, that is, socket 41, its arm 45 and end 46, and the link 47 and arm 30', constituting a linkage system, actuated by beam 42 and weight 43 to counterbalance the offset weight of harvester 14, as will further appear.

As indicated, when the harvester has been folded alongside the thresher the rod 22 and rack-bar 26 are detached, the harvester supports collapsed or telescoped in relation to axle 10, and the harvester and axle brought to the position indicated by dotted lines in Fig. 1, in which it is maintained by a rod 49 on the thresher and hooked to an eye 48 on axle 10. When the machine is moving through the field and in cutting and threshing operation it frequently becomes necessary to adjust the harvester to the height of cut of the standing grain, which may be accomplished by the adjustment of the rack-bar 25 through the manipulation of wheel 28, and in order to facilitate the vertical movements of the harvester and to minimize the efforts of the operater when so adjusting it I employ the counterbalancing mechanism disclosed (or equivalent thereof) in connection with the rocking axle 10 of the harvester, said mechanism being supported from the thresher element of the machine, and which mechanism, embodying a linkage system substantially as shown, and connected to the rocking arm 30', may be so sensitively balanced as to cause the weighted beam 42 to readily respond to the actions of the harvester as it raises and lowers, and thus counterbalance the offset weight of said harvester by moving in a direction opposite thereto in a manner well understood. In securing the counterbalancing mechanism directly upon the thresher element of the machine it will be understood that by the coupling 11 the harvester may oscillate vertically and also be swung horizontally independently of said counterbalancing mechanism without dismantling or disturbing the make-up of the harvester which, through the counterbalancing effect of the weighted beam 42, is sustained in a substantially horizontal plane above the ground, approximately as indicated in full lines in Fig. 1, so that the same may be manually swung on its wheel 12 to the position indicated in dotted lines without lifting and carrying the harvester platform and associated mechanisms, all of which with the axle 10 are maintained intact and in fixed horizontal plane with reference to each other during the folding operation, and when folded alongside the thresher said harvester may be telescoped in relation to the axle as hereinbefore explained. In this manner the handling of the harvester in the field for the purposes stated is much simplified, for the reason that, as is common where a rearwardly extending counterbalancing member is carried directly by the harvester, it becomes necessary to first remove the weight therefrom, and in some instances the arm upon which it is mounted, before swinging the harvester or uncoupling it for transport, and when such weight is so removed the harvester platform, as 14, if not otherwise sustained, falls to the ground and must be lifted and carried around when folding the harvester, the dismantled harvester thus requiring the reassemblage of its removed parts at the expenditure of considerable labor and time whenever the folding operation is to be performed. In Fig. 1 it will be noted that the coupling member 11' fixed upon axle 10 may be readily swung around between the forks 11'' forming part of the pivoted coupling 30 so that the harvester axle may freely oscillate vertically when moving over ground inequalities without straining or breaking said coupling members. And it will be further understood that when in normal or cutting position the torque effect of axle 10, with the bar 26, sustains the harvester, the rocking effect of the counterbalance upon sleeve 30 and the arm 30' connected thereto being imparted through coupling 11 to said axle 10, in other words, the counterbalance supported on the thresher, and the sleeve 30 being in effect a continuation of axle 10, the counterbalance and said sleeve cooperate in the manner stated during the vertical adjustments of the harvester.

I claim as my invention:

1. In a machine of the class described, a thresher, a support extending therefrom, a harvester, and means connecting said harvester and support whereby the harvester may be adjusted toward and from said support.

2. In a machine of the class described, a harvester, a support therefor, and extensible and retractable members connecting said harvester and support whereby the harvester may be adjusted in relation to said support.

3. In a machine of the class described, a thresher, a harvester, a support for said harvester, hinged means connecting said thresher and support, and means connecting said harvester and support whereby the harvester may be adjusted toward and from said support.

4. In a machine of the class described, a thresher, a harvester, a rocking support for said harvester connected to said thresher, and means connecting said support and harvester for adjusting the latter toward and from said support.

5. In a machine of the class described, a thresher, a harvester, an axle hingedly connected to and extending laterally from said thresher, means whereby said axle may rock at its connection with said thresher, and extensible and retractible means connecting said axle and harvester for adjusting the latter toward and from said axle.

6. In a machine of the class described, a thresher, a harvester, a support for said harvester connected to said thresher, means connecting said support and harvester for adjusting the latter toward and from said support, and means operable from said thresher for raising and lowering said harvester.

7. In a machine of the class described, a thresher, a harvester, an axle supporting said harvester, means for hingedly and rockingly connecting said axle to said thresher, and adjustable means on said axle and connected to said harvester for increasing and decreasing the distance between said axle and harvester to reduce the width of said machine when said harvester is folded alongside said thresher.

8. In a machine of the class described, a thresher, a harvester, an axle supporting said harvester and connected to said thresher, and telescoping means connecting said axle and harvester for increasing and decreasing the distance between the latter and said axle.

9. In a machine of the class described, a thresher, a harvester, an axle supporting said harvester, means for vertically adjusting said harvester, rocking means connecting said axle to said thresher, linkage mechanism connected to said rocking means, and a weighted member connected to said linkage and positioned alongside the thresher for counterbalancing the weight of said harvester when the same is being vertically adjusted.

10. In a machine of the class described, a thresher, a harvester, a support for said harvester, rocking means connecting said support to said thresher, a keeper for retaining said rocking means, means for vertically adjusting said harvester, a weighted member positioned alongside the thresher, and means connecting said rocking means and said weighted member to counterbalance the weight of said harvester during the vertical adjustment thereof.

11. In a machine of the class described, a thresher, a harvester, a support for said harvester, means for vertically adjusting said harvester, rocking means connecting said support to said thresher, a socket member, means for pivotally supporting the latter, a link connecting said rocking means and said socket member, and a weighted arm positioned alongside the thresher and connected to said socket member for counterbalancing the weight of said harvester during the vertical adjustment thereof.

12. In a machine of the class described, a thresher, a harvester, a support for said harvester, means for vertically adjusting said harvester, a coupling rockingly connecting said support to said thresher, and means associated with said coupling for counterbalancing the weight of said harvester during adjustments thereof comprising a weighted member positioned alongside the thresher, means for pivotally supporting the same, and means for connecting said member to said coupling.

13. In a machine of the class described, a harvester, a thresher, a support for said harvester extending from said thresher, means for raising and lowering said harvester, and weighted means supported by and positioned alongside said thresher for counterbalancing the weight of said harvester as the latter is raised and lowered.

14. In a machine of the class described, a harvester, a thresher, a support for said harvester extending from said thresher, adjustable means connecting said harvester to said support for increasing and decreasing the distance between said support and harvester to reduce the width of said machine when said harvester is folded alongside said thresher, means for vertically adjusting said harvester during grain cutting operations, and means for counterbalancing the weight of said harvester during its vertical adjustment.

15. In a machine of the class described, a thresher, a harvester, a coupling connecting said elements, a frame associated with said coupling, and mechanism supported on said frame for counterbalancing the weight of said harvester during the vertical adjustment thereof.

16. In a machine of the class described, a thresher, a harvester, a coupling connecting said elements, a frame positioned alongside the thresher and associated with said coupling, a socket member pivotally mounted in said frame, a beam connected to said member, an arm extending from said coupling, and a link connecting said socket member to said arm whereby when said coupling is rocked in one direction said beam will move in the opposite direction to counterbalance the weight of said harvester during vertical adjustment of the latter.

17. In a machine of the class described, a thresher, a harvester, a coupling connecting said elements, means for retaining said coupling on said thresher, a brace connected to said retaining means, an arm extending from said coupling, a supporting member secured to said arm, linkage mechanism pivotally mounted on said brace and supporting member and connected to said arm, and a weighted member supported by said linkage mechanism for counterbalancing the weight of said harvester during the vertical adjustment thereof.

18. In a combination harvester thresher, the combination, with a thresher, of a rocking support connected to one side of the thresher, and means mounted on said support embodying mechanism for counterbalancing the weight of a harvester.

19. In a machine of the class described, a harvester embodying a platform, a thresher, a support for said harvester, means connecting said support and said thresher, a ground-wheel supporting the harvester, means for vertically adjusting said harvester to the height of cut, and independent means on said thresher connected to and supporting said harvester platform in a substantially horizontal plane when said vertically adjusting means are detached from said harvester.

20. In a machine of the class described, a harvester having a platform, a thresher, a support for said harvester, means connecting said support and thresher whereby the harvester may be folded alongside said thresher, and means on said thresher connected to and supporting said harvester platform in a substantially horizontal plane during the operation of folding the same alongside the thresher.

21. In a machine of the class described, a harvester, a thresher, a rocking support for said harvester, means for hingedly connecting said support to said thresher, means for telescoping said harvester in relation to said support, and means connected to said thresher for supporting said harvester in a substantially horizontal plane as the latter is being folded in relation to said thresher.

22. In a machine of the class described, a harvester, a thresher, a support for said harvester, an arm connecting said harvester to said support, a brace secured to said support and to said arm, and a pivotally mounted draft member connecting said arm and said thresher.

23. In a machine of the class described, a thresher, a harvester, a hinged support connecting said elements, an arm connected to said support and to said harvester, a rod connecting said support and said arm, and a pivotal member connecting said arm and said thresher.

24. In a machine of the class described, a thresher, a harvester, a rocking support connecting said elements, an arm connected to said support and to said harvester, a brace connecting said support and said arm, and a pivotal member connecting said arm and said thresher.

25. In a machine of the class described, a thresher, a harvester, a hinged rocking support connecting said elements, an arm connected to said support and to said harvester, a rod connecting said support and said arm, and a pivotal member connecting said arm and said thresher.

26. In a machine of the class described, a harvester, a thresher, an axle for said harvester, a coupling fixedly secured to said axle and rotatably secured to said thresher for connecting said axle thereto, a vertical pin connecting said rotatably mounted coupling member to said axle coupling member to provide for the horizontal swinging of said harvester, and a horizontal pin connecting said axle coupling member to said rotatably mounted coupling member to provide for the vertical oscillation of said harvester.

27. In a machine of the class described, a thresher, a harvester, a rocking axle connecting the harvester to the thresher whereby the harvester may be adjusted vertically in relation to the thresher, and means mounted upon and alongside the thresher embodying mechanism for counterbalancing the weight of the harvester.

28. In a machine of the class described, a thresher, a harvester, an oscillating axle connecting the harvester to the thresher, and means mounted upon and alongside the thresher embodying mechanism for counterbalancing the weight of the harvester.

29. In a machine of the class described, a thresher, a harvester, an oscillating and rocking axle connecting the harvester to the thresher whereby the harvester may be adjusted in relation to the thresher, and means mounted upon and alongside the thresher embodying mechanism for counterbalancing the weight of the harvester.

30. In a combination harvester-thresher, detachable means for flexibly connecting the harvester to the thresher, means alongside the body of and connected to one side of the thresher and to one side of said flexible connection for counterbalancing the weight of the harvester, and means for vertically adjusting the harvester so that its weight will be counterbalanced by said mechanism.

NORMAN R. KRAUSE.